(12) United States Patent
Lloyd et al.

(10) Patent No.: US 8,775,334 B1
(45) Date of Patent: Jul. 8, 2014

(54) PERSONALIZED CAMPAIGN PLANNER

(75) Inventors: Daniel B. Lloyd, Mercer Island, WA (US); Arne C. Knudson, Seattle, WA (US); Valentin Radu Munteanu, Seattle, WA (US); Llewellyn J. Mason, Seattle, WA (US); Himanshu Khurana, Seattle, WA (US); In Jae Lee, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 401 days.

(21) Appl. No.: 12/878,478

(22) Filed: Sep. 9, 2010

(51) Int. Cl.
*G06F 15/18* (2006.01)
*G06N 99/00* (2010.01)
*G06Q 30/02* (2012.01)
*G06Q 30/00* (2012.01)

(52) U.S. Cl.
CPC .......... *G06N 99/005* (2013.01); *G06Q 30/0242* (2013.01); *G06Q 30/0251* (2013.01)
USPC .................. 706/12; 705/14.41; 705/14.49

(58) Field of Classification Search
CPC ............ G06N 99/005; G06Q 30/0242; G06Q 30/0251
USPC .............................. 706/12; 705/14.41, 14.49
See application file for complete search history.

(56) References Cited

U.S. PATENT DOCUMENTS

| | | | |
|---|---|---|---|
| 6,895,398 B2 * | 5/2005 | Evans-Beauchamp et al. | 706/50 |
| 7,130,808 B1 * | 10/2006 | Ranka et al. | 705/14.43 |
| 7,552,069 B2 * | 6/2009 | Kepecs | 705/14.25 |
| 7,742,944 B2 | 6/2010 | Dicker et al. | |
| 7,937,336 B1 * | 5/2011 | Maynard-Zhang et al. | 706/12 |
| 2001/0049624 A1 * | 12/2001 | Uyama et al. | 705/14 |
| 2004/0204989 A1 | 10/2004 | Dicker et al. | |
| 2006/0253537 A1 * | 11/2006 | Thomas | 709/206 |
| 2006/0259360 A1 * | 11/2006 | Flinn et al. | 705/14 |
| 2008/0153520 A1 * | 6/2008 | Kirtane | 455/466 |
| 2010/0241508 A1 * | 9/2010 | Ikonen et al. | 705/14.42 |
| 2010/0250477 A1 * | 9/2010 | Yadav | 706/14 |

OTHER PUBLICATIONS

Cho, Yoon Ho, Jae Kyeong Kim, and Soung Hie Kim. "A personalized recommender system based on web usage mining and decision tree induction." Expert Systems with Applications 23.3 (2002): 329-342.*
Kim, Jong Woo, et al. "A preference scoring technique for personalized advertisements on Internet storefronts." Mathematical and computer modelling 44.1 (2006): 3-15.*
Wei, Chih-Ping, Michael J. Shaw, and Robert F. Easley. "Recommendation Systems in Electronic Commerce." E-Service: New Directions in Theory and Practice (2002): 168.*
Pazzani, Michael, and Daniel Billsus. "Content-based recommendation systems." The adaptive web (2007): 325-341.*

(Continued)

*Primary Examiner* — Jeffrey A Gaffin
*Assistant Examiner* — James F Sugent
(74) *Attorney, Agent, or Firm* — Thomas Horstemeyer, LLP

(57) ABSTRACT

Campaign messages may be prioritized for a given potential recipient by generating one or more learning structures associated with the campaign message. The learning structure(s) is then evaluated relative to the potential recipient to determine potential effectiveness of the campaign messages for the potential recipient. One such learning structure is a decision tree comprising a hierarchy of attributes associated with past recipients of the campaign message. Attributes associated with the potential recipient are then applied to the decision tree to obtain a metric of potential value of the campaign message to the potential recipient.

24 Claims, 6 Drawing Sheets

(56) References Cited

OTHER PUBLICATIONS

Bae, Sung Min, Sang Chan Park, and Sung Ho Ha. "Fuzzy web ad selector based on web usage mining." Intelligent Systems, IEEE 18.6 (2003): 62-69.*

"Mapping Attributes to Network Addresses", U.S. Appl. No. 11/771,679, Jun. 29, 2007.

"Automated Targeting of Content Components", U.S. Appl. No. 12/035,618, Feb. 22, 2008.

* cited by examiner

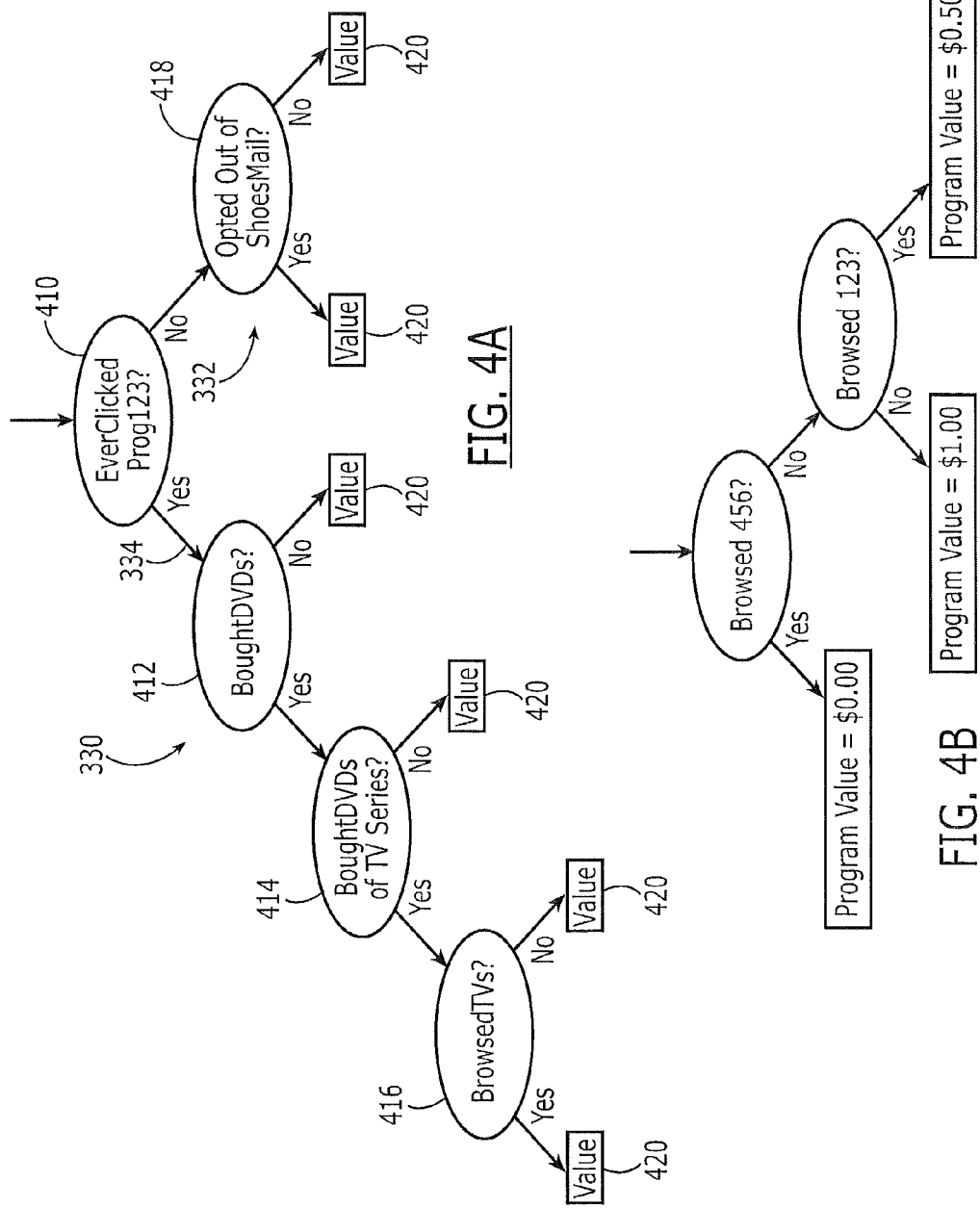

PERSONALIZED CAMPAIGN PLANNER

BACKGROUND

Online buying and selling of products or services over computer networks, such as the Internet, have continued to proliferate with widespread Internet usage. In order to facilitate the sale of goods and services, online sellers of goods and services often design marketing campaigns, also referred to as "campaigns," wherein a given campaign message, such as an email, text message and/or instant message, is sent to a given set of recipients. Unfortunately, if too many campaign messages are received by a given recipient over a given time period, the campaign messages may be less effective, or the recipient may even opt out of receiving future campaign messages.

BRIEF DESCRIPTION OF THE DRAWINGS

FIGS. 4A and 4B illustrate example decision trees of a learning structure generator, such as a learning structure generator 240 of FIG. 2.

DETAILED DESCRIPTION

Figure 1:
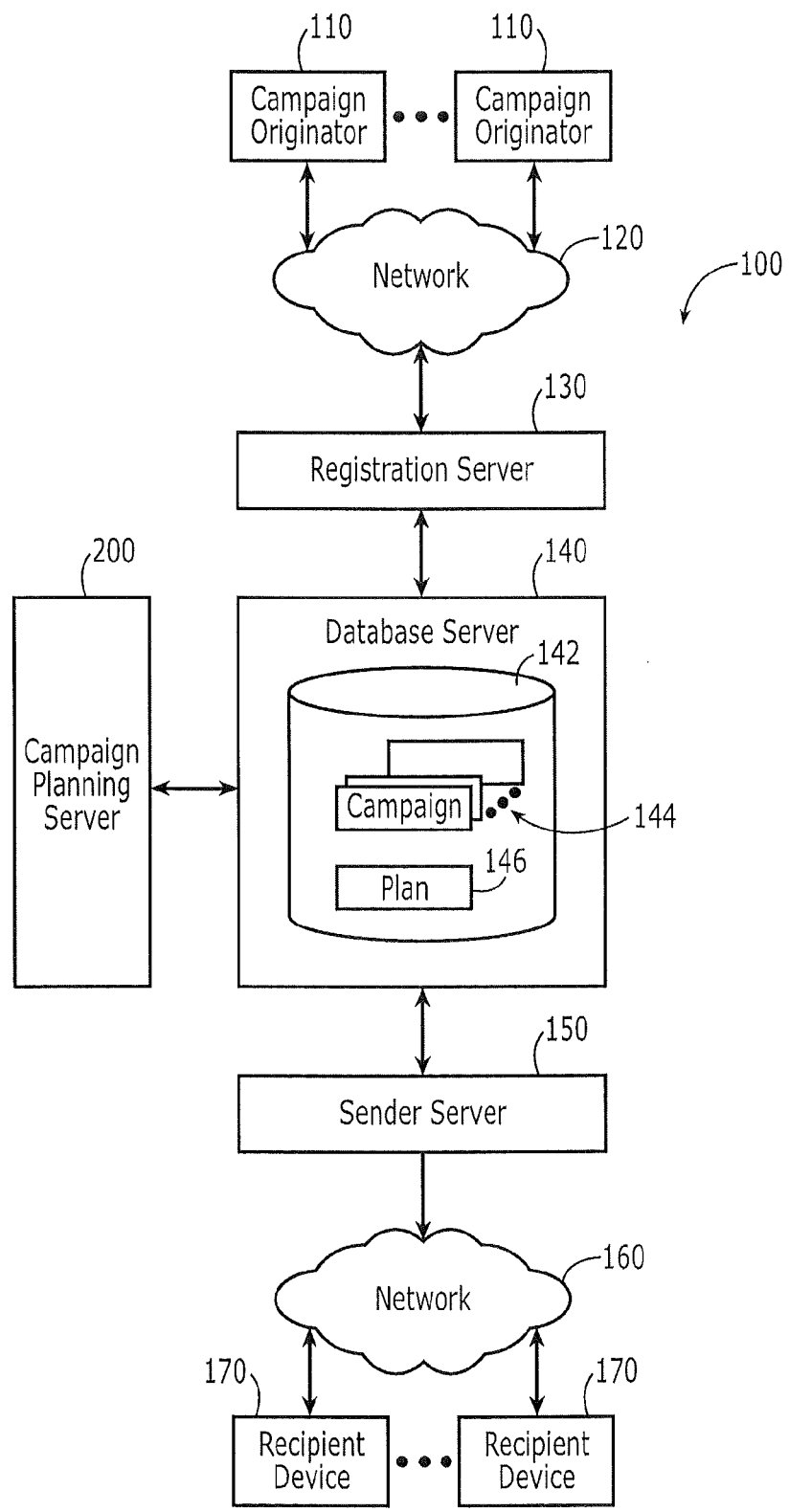
FIG. 1 is a block diagram of systems, devices, methods and computer program products for prioritizing campaign messages based on potential value to a potential recipient, according to various embodiments described herein.

Various embodiments described herein can determine an effectiveness metric of one or more campaign messages for a given potential recipient. Based at least in part on the effectiveness metric, campaign messages may be prioritized and selected for delivery to a respective potential recipient. Accordingly, a personalized effectiveness metric may be determined and then used, at least in part, to prioritize campaign messages that are selected for delivery to the given recipient, using, for example, an email, text message and/or instant message.

More specifically, a campaign planning server may be provided for prioritizing campaign messages within a program or group of generally similar campaign messages. A campaign message has a list of potential recipients associated therewith. The campaign planning server may be configured to generate a learning structure for at least one of the campaign messages. The learning structure is evaluated relative to a respective potential recipient to determine an effectiveness metric of a campaign message for the potential recipient. The learning structure may include a decision tree, a neural network, a support vector machine, a Bayesian probability network and/or other learning structures. In some embodiments, the effectiveness metric may be based on a measure of effectiveness in attracting the attention or interest of the recipient. In other embodiments, the effectiveness metric may be based on a measure of a potential economic value of the campaign message relative to the respective potential recipient.

Even more specifically, various embodiments described herein may provide a campaign planning server for prioritizing campaign messages associated with a given program of campaign messages. A respective campaign message has a list of potential recipients associated therewith. The campaign planning server includes a campaign planner that comprises a decision tree generator and a decision tree evaluator. The decision tree generator is configured to generate a decision tree for at least one of the campaign messages. The decision tree comprises a hierarchy of attributes of past recipients of the at least one of the campaign messages that segment decisions among a hierarchy of subgroups of the past recipients. The decision tree evaluator is configured to apply attributes of a potential recipient to the decision tree to obtain a metric of potential value of at least one of the campaign messages to the potential recipient.

One decision tree may be generated and evaluated for an individual campaign, for a plurality of campaigns and/or for a program of related campaigns. The decision tree evaluator may apply attributes of a potential recipient to the decision tree by traversing the decision tree from a root node thereof to a leaf node thereof based upon the attributes of the potential recipient. The decision tree may also apply a metric of economic value to each of the leaf nodes thereof and may assign the metric of economic value of the leaf node that is traversed for the potential recipient.

In some embodiments described herein, there may be sufficient attributes associated with a given recipient so as to allow identification of an effectiveness metric for a campaign message for the given recipient. According to other embodiments, when sufficient attributes are not present and/or under other circumstances, an effectiveness metric may be determined for a subgroup of the potential recipients that includes the potential recipient. Stated differently, a personalized effectiveness metric may be obtained for a recipient for whom not enough attributes are available, by associating the recipient with a subgroup of similar recipients for whom sufficient attributes are available and by basing the personalized effectiveness metric on the subgroup of recipients for whom sufficient attributes are available.

Moreover, the learning structures that are generated may be used for additional purposes beyond generating an effectiveness metric for a given potential recipient. For example, the learning structures may also be used to expand the number of potential recipients for a campaign to recipients who were not initially included in a list of potential recipients for a campaign. The learning structure, such as a decision tree, may be traversed for a recipient who is not initially included in the list of potential recipients for a campaign, to determine the potential effectiveness of the campaign message for the originally non-targeted recipient. The campaign message may then be sent to this non-targeted recipient depending upon the effectiveness metric that was determined, even though the non-targeted recipient was not initially included in the list of potential recipients for the campaign. Thus, targets for a given campaign may be expanded beyond the original list.

Target expansion may be used in other embodiments without the need to provide a learning structure. For example, a set of targeted recipients may be obtained for a campaign message, and a potential recipient that is outside (i.e., not included in) the set of targeted recipients may be identified. The campaign message may then be communicated to a recipient device of the potential recipient, even though the potential recipient is outside the set of targeted recipients for the campaign. More specifically, it may be determined that the campaign message has a high potential effectiveness and/or a high potential economic value relative to the potential recipient, even though the potential recipient is initially outside the set of targeted recipients for the campaign message. In some embodiments, the potential recipient may be selected randomly from a group of potential recipients that are outside the set of targeted recipients for the campaign message. Other selection criteria also may be used.

Heretofore, relevant campaign messages have been automatically selected for transmission to recipients by determining campaign scores for campaigns and assigning eligible recipients to campaigns with a highest score. Various embodiments described herein may arise from recognition that the assigning of a recipient to a campaign having a highest campaign score may reduce the number of campaign messages that are received by a given recipient, but the campaign messages that are received may not be highly relevant to the given recipient. For example, the most effective campaigns from a sales volume standpoint may not be highly relevant to a given potential recipient of the campaign message. Various embodiments described herein can determine an effectiveness metric of one or more campaign messages for a given potential recipient. Based at least in part on the effectiveness metric, campaign messages may be prioritized and selected for delivery to the potential recipient. Accordingly, a personalized effectiveness metric may be determined and then used, at least in part, to prioritize campaign messages that are selected for delivery to the given recipient, using, for example, an email, text message and/or instant message.

Overall Architecture

FIG. 1 is a block diagram of systems (including devices such as servers), methods and/or computer program products for prioritizing campaign messages based on potential value to a potential recipient, according to various embodiments described herein. These systems, devices, methods and computer program products 100 receive campaign data from one or more campaign originators 110 and ultimately send prioritized campaign messages to a plurality of recipient devices 170 based on their potential value to a potential recipient at the recipient device 170.

In electronic commerce, a campaign generally refers to a single message that is delivered to many recipients. The message may have identical content for all recipients in some embodiments. However, in other embodiments, the content in the message may be varied depending upon the campaign delivery technique and/or the recipient device capabilities. In yet other embodiments, the content in the campaign message may be personalized for the individual recipient. For example, a readable campaign message may be delivered via email, text message or short message, whereas an audible message may be delivered by voice mail, among other possibilities. As such, although the campaign message relates to a single campaign, such as a sales campaign for a given book, the content of the message may vary depending upon the mode of delivery. Moreover, recipient devices may generally range from desktop, notebook, netbook, laptop, smartphone, electronic book reader, game console and/or any other embedded device(s) having different processing, connectivity and/or user interface capabilities. As such, the campaign message may also be tailored to the type of recipient device.

Campaigns may also be grouped into programs of generally similar campaigns that may have the same type of content and/or may target the same type of users. Thus, in one scenario, various individual campaigns for books may be grouped into an overall program of campaigns for books. Alternatively, campaigns for a given title of a work may be grouped into a program of campaigns for a related book, movie, audiobook, download, etc. Other groupings may be provided.

A given campaign may be initiated manually and/or programmatically, and may be valid for a short period of time, such as a single day, or for a longer period of time, such as days, weeks, months or more. Moreover, for a given campaign, a list of potential recipients is generated. The list of potential recipients may be generated using various techniques such as the recipient opting into a related campaign, analysis of recipients prior purchasing or browsing activity, and/or random techniques, among other possibilities.

Referring again to FIG. 1, the campaign messages may originate from one or more campaign originators 110. Each campaign originator 110 may be embodied by one or more enterprise, application, personal, pervasive and/or embedded computer systems that may be standalone and/or interconnected by a public and/or private, wired and/or wireless, real and/or virtual network including the Internet. The campaigns may be originated within an enterprise that is selling given goods and/or services and/or by third parties external to the enterprise who are selling their goods and services via the enterprise. In any event, a given campaign may include a campaign message and a list of potential recipients associated therewith. It will also be understood that different parties may generate the campaign message and the list of potential recipients. For example, a third party vendor may originate the campaign message, but the selling enterprise may originate the list of potential recipients. In another embodiment, the list of potential recipients may be jointly generated by the campaign originator 110, based on prior campaigns at other sellers and/or by the seller based on prior campaigns of other campaign originators 110.

A registration server 130 may be used to gather registration information for campaigns by providing a user interface for the campaign originators 110. The campaign originators 110 may communicate with the registration server 130 over a network 120, such as a public and/or private, wired and/or wireless, real and/or virtual network including the Internet.

Continuing with the description of FIG. 1, a database server 140 is responsive to the registration server 130 and may include a database 142 that stores the campaigns 144 therein. The campaigns may be grouped by programs, as was described above, and a given campaign may also have a list of potential recipients associated therewith. Accordingly, for a given seller of goods and services, there may be hundreds or more of campaign originators 110 who prepare and send merchandising campaigns for their channel (for example books or DVDs). The originator and/or the seller may specify a list of potential recipients. Accordingly, in many cases, more than one campaign message may be targeted to the same recipient device 170 concurrently (on the same day or within a given time period). However, allowing a customer to receive up to hundreds or more of messages in a single given period may be counterproductive.

Referring again to FIG. 1, a campaign planning server 200 according to various embodiments described herein can determine an effectiveness metric of one or more campaign messages for a potential recipient. Thus, a personalized or individualized effectiveness metric may be generated for a given campaign, for a plurality of campaigns or for an entire program of campaigns, based on the potential effectiveness for the potential recipient. The personalized or individualized metrics of potential value for the potential recipients may be stored in the database 142 and may be used to formulate a daily or periodic plan 146 to select the messages to send for that day or other time period. Various embodiments of a campaign planning server 200 will be described in detail below.

A sender server 150 may provide a user interface for sending the campaign messages from the plan 146 to the various recipient devices 170 in the form of for example, emails, instant messages and/or text messages. The sender server 150 communicates with the recipient devices 170 over a network 160, which may be a public and/or private, virtual and/or real, wired and/or wireless network including the Internet, and which may be same as and/or different from network 120.

The registration server 130, the database server 140, the sender server 150 and/or the campaign planning server 200 may be embodied as one or more enterprise, application, personal, pervasive and/or embedded computer systems that may be standalone and/or interconnected by a public and/or private, real and/or virtual, wired and/or wireless network including the Internet.

Finally, a plurality of recipient devices 170 receive the campaign messages. It will be understood that each of the recipient devices 170 may be embodied as one or more enterprise, application, personal, pervasive and/or embedded computers, such as a desktop, notebook, netbook, laptop, smartphone, electronic book reader, game console and/or any other embedded device. Moreover, a given recipient may own one or more recipient devices 170 of various configurations and/or may log on to a recipient device that is owned and/or controlled by another entity.

Campaign Planning Server

An overall discussion of a campaign planning server, such as the campaign planning server 200 of FIG. 1, will now be provided. Specifically, the campaign planning server 200 can generate a metric for a given campaign, for a plurality of given campaigns and/or for a given program of campaigns, that is personalized or individualized to the individual potential recipient.

Heretofore, a campaign planning server such as described in U.S. Patent Application Publication 2004/0248989 to Dicker et al. could generate a campaign score to indicate the potential economic value of a campaign and to allow comparisons of one campaign with another. Based on the campaign score, the most economically valuable campaign or campaigns could be selected to send to the recipients, while not selecting less economically valuable campaigns. Specifically, since a program is a group of similar campaigns, an assumption may be made that the performance of a campaign in a group is the same as the average historic performance of the recent campaigns in its program. A list of campaigns that are able to be sent to a given recipient is generated, the campaign with the highest program value may be selected, and a campaign message from that campaign may be sent to a given recipient pursuant to a periodic plan.

Unfortunately, campaign planning under these assumptions may not distinguish individual recipients within each campaign or even within each program. Thus, for example, the value used as a prediction for the revenue generated when sending a particular campaign to a particular recipient may be the average revenue per recipient for the program. Moreover, there may be no distinction among different campaigns in the same program, so that two campaigns in the same program may perform very differently, yet they may be treated equally. In fact, a simple "winner takes all" approach may be used by a allocating all eligible recipients to the campaign with the highest program value. Send frequency (in-box management) may also be decided without regard to the predicted value of a campaign to a given recipient, or how the given recipient has engaged with previous campaigns.

Campaign planning servers according to various embodiments described herein may provide a personalized or individualized value for a given campaign, group of campaigns or program of campaigns, indicating predicted value of the given campaign(s) and/or program(s) relative to a particular recipient. Various embodiments described herein may find, for example, that a given campaign may be highly successful across a wide range of recipients, but may be predicted to be of very low potential success for this given recipient. By prioritizing campaign messages based on a personalized/individualized effectiveness metric, such as a metric that is based on a potential interest and/or economic value of a campaign message(s) relative to the respective potential recipient, more accurate targeting of campaign messages to a given recipient may be provided. The recipient may therefore receive campaign messages that are of greater value to the recipient, leading to greater recipient satisfaction and/or greater recipient purchases of goods/services, and thus potentially improving the aggregate performance of multiple campaigns and/or groups of campaigns.

Figure 2:
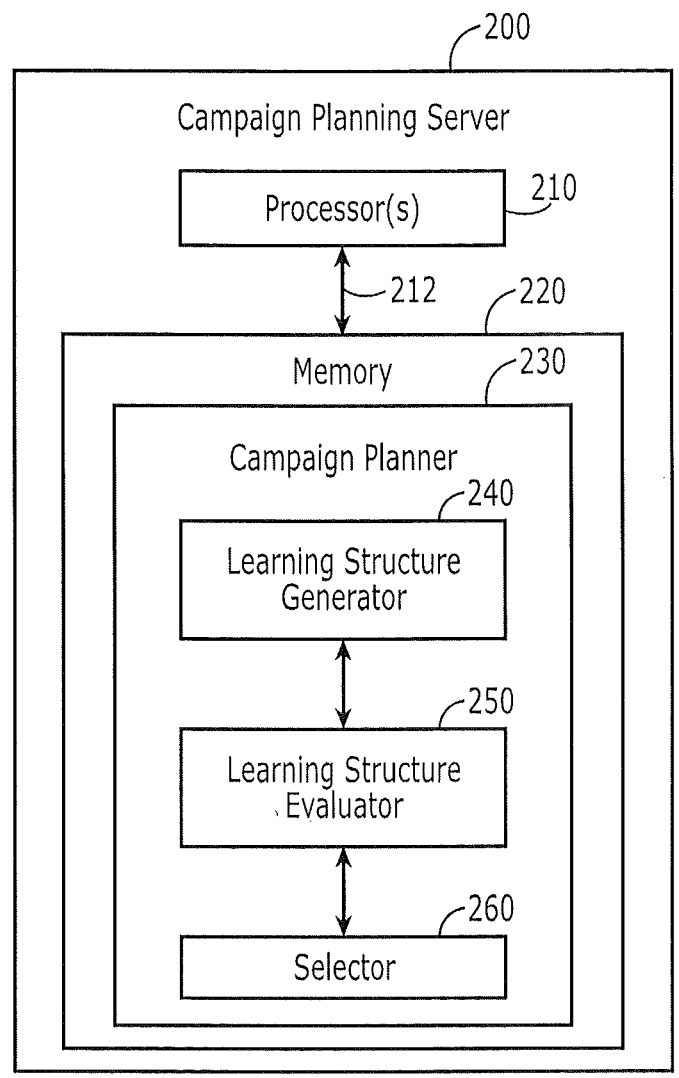
FIG. 2 is a block diagram of a campaign planning server, such as the campaign planning server 200 of FIG. 1.

FIG. 2 is a block diagram of a campaign planning server, such as the campaign planning server 200 of FIG. 1. The campaign planning server 200 may include a processor 210, such as one or more enterprise, application, personal, pervasive and/or embedded computer systems that may be standalone and/or connected by a wired and/or wireless, real and/or virtual, public and/or private network including the Internet. A bus 212 connects the processor with one or more memory devices 220, which may include solid state memory devices (such as static, dynamic, volatile and/or non-volatile solid state memory devices) and/or movable memories (such as rotatable magnetic and/or optical memory devices in the form of discs and/or tapes). The memory devices 220 may be arranged in a hierarchy of devices and may be standalone and/or connected by a wired and/or wireless, real and/or virtual, public and/or private network including the Internet. The memory devices 220 may store a campaign planner 230 that comprises a learning structure generator 240, a learning structure evaluator 250 and a selector 260. The campaign planner 230 including the learning structure generator 240, the learning structure evaluator 250 and/or the selector 260 may be embodied by computer-readable program code. However, in other embodiments, the campaign planner may be embodied at least in part by special purpose hardware including application-specific integrated circuits.

Still continuing with the description of FIG. 2, the learning structure generator 240 may be configured to generate a learning structure for at least one of (i.e., for one or more of) the campaign messages. As will be described in detail below, a learning structure may be generated for a campaign message, for a plurality of campaign messages, or for an entire program of campaign messages. The learning structure generator 240 may generate a decision tree, a neural network, a support vector machine, a Bayesian probability network and/or other learning structure. The learning structure evaluator 250 is configured to evaluate the learning structure relative to the potential recipient, to determine a effectiveness metric of at least one of the campaign messages for the potential recipient.

The selector 260 is configured to select a subset of the campaign messages for sending to the potential recipient based upon the metrics of potential value of the at least one of the campaign messages to the potential recipient. The selector may use the metrics that were generated by the learning structure evaluator as a criterion for determining the message that is sent to a given recipient. It will be understood that the selector may use other criteria for mailbox management as described, for example, in the above-cited U.S. Patent Application Publication 2004/0204989.

Decision Trees

According to some embodiments, the learning structure is a decision tree. Accordingly, the learning structure generator 240 may be embodied by a decision tree generator, and the learning structure evaluator 250 may be embodied by a decision tree evaluator. As is known to those having skill in the art, a decision tree may be used as a predictive model which maps observations about an item to conclusions about the item's target value. These tree structures include a plurality of nodes that are interconnected by branches. The nodes of a tree begin with a root node and terminate with a leaf node. Each node of the tree represents a variable or attribute, and each branch represents a segmentation of the attribute into a smaller subgroup. Thus, a decision tree can be "learned" by splitting the source set into subsets based on an attribute value test. This splitting may be repeated on each derived subset in a recursive manner until the subsets at a node all have the same value of the target variable, when splitting no longer adds value to the predictions and/or when other termination parameters are met.

A learning structure generator 240 for a campaign(s) according to various embodiments described herein, generates a decision tree that comprises a hierarchy of attributes of past recipients of a campaign message(s) that segments decisions among a hierarchy of subgroups of the past recipients. A decision tree evaluator 250 then can apply attributes of a potential recipient to the decision tree to obtain a metric of potential value of the campaign message(s) to the potential recipient.

Figure 3A:
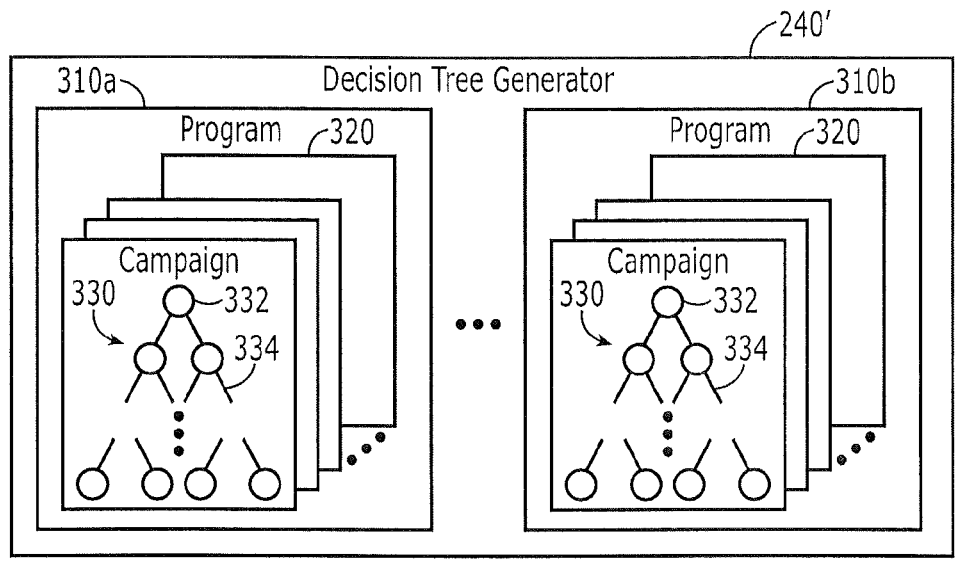
FIGS. 3A and 3B are block diagrams of learning structure generators, such as learning structure generators 240 of FIG. 2.
Figure 3B:
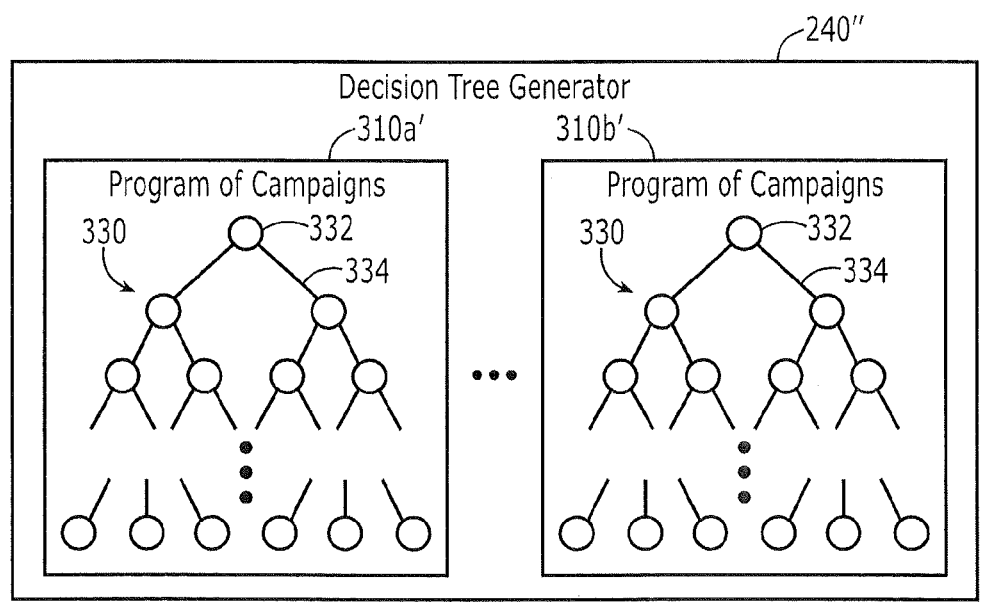
Figure 5:
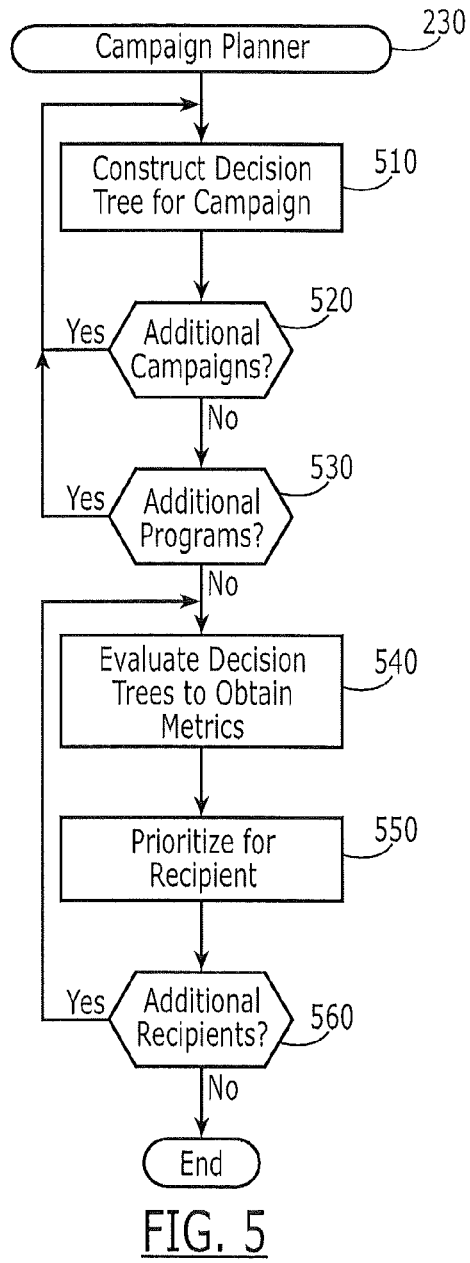
FIGS. 5 and 6 are flowcharts of operations that may be performed by a campaign planner, such as the campaign planner 230 of FIG. 2.
Figure 6:
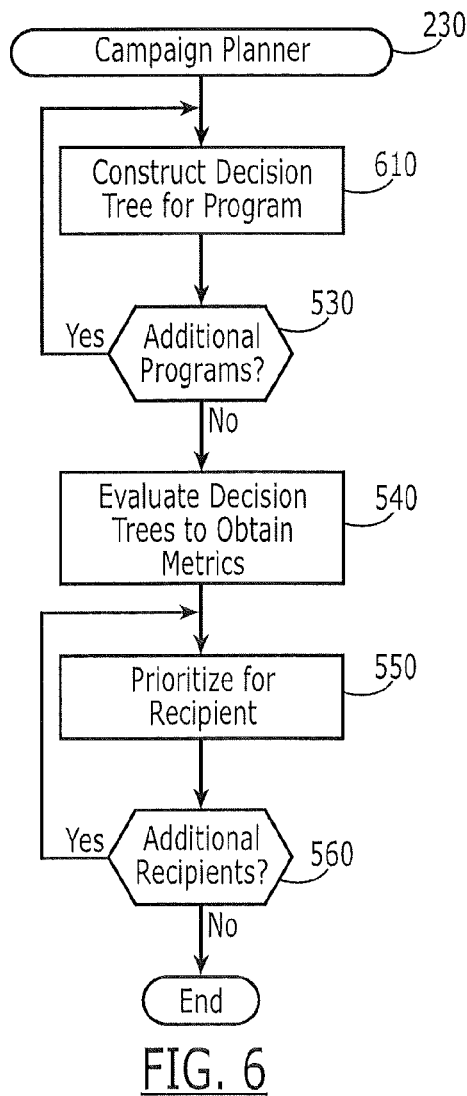

A decision tree may be generated for individual campaigns as illustrated in FIGS. 3A, 4 and 5, for a program(s) of campaigns, as illustrated in FIGS. 3B, 4 and 6, or for a subset of campaigns within a program. Thus, the decision tree generator may be configured to generate a decision tree for at least one of the campaign messages, wherein the decision tree comprises a hierarchy of attributes of past recipients of the at least one of the campaign messages that segment decisions among a hierarchy of subgroups of the past recipients. The decision tree evaluator may then be configured to apply attributes of a potential recipient to the decision tree, to obtain a metric of potential value of the at least one of the campaign messages to the potential recipient.

FIG. 3A illustrates a learning structure generator that comprises a decision tree generator 240' that is configured to generate a respective decision tree 330 for a respective one of the campaign messages 320. In some embodiments, a decision tree 300 may be identical for more than one campaign. The decision tree 330 comprises a tree of nodes 332 and branches 334, so as to provide a hierarchy of attributes of past recipients of the campaign message 320 that segments decisions among the hierarchy of subgroups of the past recipients. In these embodiments, the decision tree evaluator 250 of FIG. 2 may be configured to apply attributes of a potential recipient to the decision tree 330, so as to obtain the metric of potential value of a campaign message 320 to a potential recipient.

As also illustrated in FIG. 3A, a plurality of campaign messages 320 may be organized into a program 310a/310b. The decision tree generator 240' may be configured to generate a separate decision tree 330 for a respective campaign message 320 in a first program 310a of campaign messages 320, and to also generate a separate decision tree 330 for a respective campaign message 320 in a second group 310b of campaign messages 320. Some or all of the decision trees 330 that are generated may then be evaluated by applying attributes of a potential recipient to the decision tree(s) to obtain a metric of potential value of the at least one of the campaign messages to the potential recipient. For example, a decision tree may be generated based on data corresponding to a first subset of the targeted recipients for a campaign message. Then, the decision tree may be evaluated for a second subset of the targeted recipients, such as the remaining targeted recipients for the campaign message.

FIG. 5 is a flowchart of operations that may be performed to generate one decision tree per campaign, as illustrated, for example, in FIG. 3A. Specifically, referring to FIG. 5, a decision tree is constructed for a given campaign at Block 510 and, if additional campaigns are present at Block 520, a decision tree is constructed for the additional campaigns. When there are no more additional campaigns, for example when all of the campaigns 320 in a program 310a have been constructed, then a test is made at Block 530 as to whether an additional program, such as program 310b is present. If so, decision trees are constructed for the campaign(s) in the additional program(s). Thus, operations of Blocks 510, 520 and 530 can provide a decision tree structure of FIG. 3A.

Continuing with the description of FIG. 5, at Block 540, the decision tree is evaluated by applying attributes of a potential recipient to the decision tree(s) to obtain a metric of potential value of the campaign messages in the programs to a potential recipient. It will be understood that operations of Block 540 may be performed by a learning structure evaluator 250 in some embodiments. Then, at Block 550, the campaign messages are prioritized for the recipient. This prioritizing may be performed, for example, by a selector 260 of FIG. 2 by selecting a subset (i.e., one or more but less than all) of the campaign messages for sending to a one of the potential recipients based upon the metrics of potential value of the at least one of the campaign messages to the potential recipients that were previously determined. Finally, at Block 560, if additional recipients are present, operations of Blocks 540 and 550 may be performed for these additional recipients.

FIGS. 3B and 6 illustrate other embodiments where a decision tree is generated per program of campaigns. Thus, referring to FIG. 3B, a decision tree generator 240" is configured to generate a decision tree 330 for a program 310a' of campaign messages. The decision tree 330 comprises a hierarchy of attributes of past recipients of the program 310a' of campaign messages that segments decisions among a hierarchy of subgroups of the past recipients. The decision tree evaluator 250 of FIG. 2 may be configured to apply attributes of a potential recipient to the decision tree to obtain a metric of potential value of the program 310a' of campaign messages to the potential recipient. The selector 260 may then be used to select a subset of the campaign messages for sending to the potential recipient based on the metrics of potential value of the program of campaign messages to the potential recipients. As also shown in FIG. 3B, similar operations may be performed to generate a second decision tree 330 for a second program 310b' of campaign messages and to evaluate the decision tree 330.

Operations to generate and evaluate a decision tree of FIG. 3B, according to some embodiments, are illustrated in FIG. 6.

Referring to FIG. 6, at Block 610 a decision tree is constructed for a given program and if additional programs are present at Block 530, a decision tree is constructed for the additional programs at Block 610, to yield a decision tree structure of FIG. 3B. The decision trees are then evaluated as was described at Block 540, and prioritization takes place at Block 550 for remaining recipients at Block 560, as was described above in connection with FIG. 5.

Decision Tree Examples

FIGS. 4A and 4B illustrate examples of decision trees that may be generated according to various embodiments described herein. These decision trees may be regarded as simplified decision trees in that they may not reflect all of the different attributes that may apply to a given campaign or program. However, even simplified decision trees as illustrated in FIGS. 4A and 4B may provide relevant prioritization information when they are applied to a given prospective user.

As noted above, the decision trees segment on a series of attributes. A group of recipients determined by a previous segmentation may be segmented again by a different attribute. The best attribute to use can be determined dynamically based on, for example, how much it helps to differentiate between the segments involved and/or how many recipients it breaks each segment into (i.e., the information gain). Decision trees may be especially useful because they are human-readable and flexible in the data they can accept. When visually displayed, for example, presented, viewed on a display device, etc., campaign originators 110 may be able see and understand how the recipient base for their campaign or program was being segmented and can analyze why some attributes were more important than others. Furthermore, new attributes may be added by writing customer-specific data to a table that the decision tree generator would then consume. Even if an attribute was created that only matters for a single program or campaign, it may be ignored by all the other program or campaign decision trees, because there can be a decision tree for each program, campaign or campaigns.

Referring to FIG. 4A, a root node 410 of the decision tree segments on whether a recipient ever interacted with (e.g., clicked on, viewed, etc.) a campaign associated with a program 123. If yes, then a next level node 412 segments on whether a recipient has bought any DVDs. If yes, then a next level node 414 segments on whether a recipient bought DVDs of a television series, and if yes, a segmentation at node 416 is again performed as to whether a recipient has browsed any items in a TV category/node. It will be understood that any or all of these segmentations may also incorporate a time factor. For example, the next level node 414 may segment on whether a recipient bought DVDs of a television series within the last week or within another time interval. As also illustrated, a value 420 may be associated with each leaf node of the tree based on the potential economic value of the decision. In some embodiments, the value 420 may be generated by adding the values of all branches leading up to the leaf node. Many other techniques may be used to determine the value 420. Values also may be normalized to allow comparisons across campaigns/programs. When evaluating the decision tree for a given potential recipient, the value that is obtained when traversing the tree for the given potential recipient may be used to set a priority metric. In some embodiments, the higher the value, the higher the priority metric. The priority metric also may be normalized to allow comparisons across campaigns/programs.

FIG. 4B illustrates another example decision tree, wherein each leaf includes a value that may be used in the decision tree. An embodiment that can generate the decision of FIG. 4B will now be described in detail. It will be understood, however, that many other techniques may be used to generate a decision tree.

In general, the decision tree of FIG. 4B may be used to predict effectiveness for a potential recipient by assigning a value to a node that is based on a click-through rate of the node multiplied by the average program value. However, other metrics may be used. Generation of the decision tree of FIG. 4B may begin with the following dataset that represents all of the emails sent for a given program, named "program 01234". As shown in the following dataset, a listing of all past recipients who received an email associated with program 01234 may be provided. In this dataset, program 01234 may include two different campaigns labeled "0123" and "4567". For each recipient, data is provided as to whether they clicked on the campaign and whether they browsed a given node, such as node 0123, node 456, or node 789, in a given week. From this raw data, a tree may be generated. The tree may have a maximum allowed depth, here 2, which may be set in advance, and may also generate the maximum number of points in a leaf, here 4. These values may be set to higher or lower values depending on how complicated a tree is desired. Moreover, a value of the program may be set to a dollar value, here $0.50. This dollar value may be computed using many techniques.

| CustomerID | CampaignID | Clicked? | BrowsedNode123ThatWeek | BrowsedNode456ThatWeek | BrowsedNode789ThatWeek |
|---|---|---|---|---|---|
| 12 | 0123 | Yes | Yes | No | No |
| 34 | 0123 | No | No | Yes | Yes |
| 56 | 0123 | Yes | No | No | No |
| 78 | 0123 | No | Yes | No | No |
| 910 | 0123 | Yes | No | No | Yes |
| 12 | 4567 | Yes | No | No | No |
| 34 | 4567 | No | No | Yes | No |
| 1516 | 4567 | No | No | Yes | No |
| 1718 | 4567 | Yes | Yes | No | No |
| 1920 | 4567 | No | Yes | No | Yes | maxDepth=2
maxPointsInALeaf=4
programValue=$0.50 (OPS/mail)

Five rounds of processing may be provided to generate a hierarchy of attributes of past recipients of the campaign messages that segments decisions among a hierarchy of subgroups of the past recipients, beginning with the root node:

—Round 1: Find the Root—
Is the branch at a depth of >2? No, keep going.
Is the data set <4? No, keep going.

$I = (\%\text{ClickedWhenTrue} - \%\text{ClickedWhenFalse})^2 * (\#\text{of True} * \#\text{of False})^2$, $I(\text{BrowsedNode}\mathbf{123}\text{ThatWeek}) = (0.5-0.5)^2 * (4*6)^2 = 0$.
$I(\text{BrowsedNode}\mathbf{456}\text{ThatWeek}) = (0-0.714)^2 * (3*7)^2 = 224.82$,
$I(\text{BrowsedNode}\mathbf{789}\text{ThatWeek}) = (0.333-0.571)^2 * (3*7)^2 = 24.89$.

Thus, browsed node 456 is the most informative attribute and becomes the root of the tree.

—Round 2: Make the 'BrowsedNode456ThatWeek=Yes' Branch—
Data set for this branch:

| CustomerID | CampaignID | Clicked? | BrowsedNode123ThatWeek | BrowsedNode456ThatWeek | BrowsedNode789ThatWeek |
|---|---|---|---|---|---|
| 34 | 0123 | No | No | Yes | Yes |
| 34 | 4567 | No | No | Yes | No |
| 1516 | 4567 | No | No | Yes | No |

Is the branch at a depth of >2? No, keep going.

Is the data set<4? Yes, stop this branch here.

ValueOfARecipientInThisLeaf=programValue*Click%InThisLeaf/Click%InThisProgram=$0.50*0/0.5=$0.00.

Note that while this leaf has $0.00 program value because the leaf size was set to '<4' and that is not statistically significant, in practice a real leaf size of, for example, '<1000' may be statistically significant. In such a scenario, having all 1000 data points not clicking is an indication the users with these attributes will not ever click or buy from this program. They will, nevertheless, have future chances with this program when that tree is rebuilt and its data has expired.

—Round 3: Make the 'BrowsedNode456ThatWeek=No' Branch—
Data set for this branch:

| CustomerID | CampaignID | Clicked? | BrowsedNode123ThatWeek | BrowsedNode456ThatWeek | BrowsedNode789ThatWeek |
|---|---|---|---|---|---|
| 12 | 0123 | Yes | Yes | No | No |
| 56 | 0123 | Yes | No | No | No |
| 78 | 0123 | No | Yes | No | No |
| 910 | 0123 | Yes | No | No | Yes |
| 12 | 4567 | Yes | No | No | No |
| 1718 | 4567 | Yes | Yes | No | No |
| 1920 | 4567 | No | Yes | No | Yes |

Is the branch at a depth of >2? No, keep going.
Is the data set<4? No, keep going.
I=(%ClickedWhenTrue−%ClickedWhenFalse)^2*(#of True*#of False)^2.
  I(BrowsedNode123ThatWeek)=(0.5−1)^2*(4*3)^2=36.
  I(BrowsedNode789ThatWeek)=(0.5−0.8)^2*(2*5)^2=9.
Thus, browsed node 123 is the most informative attribute at this branch.
  —Round 4: Make the 'BrowsedNode456ThatWeek=No>BrowsedNode123 ThatWeek=Yes' Branch—
Data set for this branch:

| CustomerID | CampaignID | Clicked? | BrowsedNode123ThatWeek | BrowsedNode456ThatWeek | BrowsedNode789ThatWeek |
|---|---|---|---|---|---|
| 12 | 0123 | Yes | Yes | No | No |
| 78 | 0123 | No | Yes | No | No |
| 1718 | 4567 | Yes | Yes | No | No |
| 1920 | 4567 | No | Yes | No | Yes |

Is the branch at a depth of >2? Yes, stop this branch here.
ValueOfARecipientInThisLeaf=programValue*Click%InThisLeaf/Click%InThisProgram=$0.50*0.5/0.5=$0.50.
  —Round 5: Make the 'BrowsedNode456ThatWeek=No>BrowsedNode123 ThatWeek=No' Branch—
Data set for this branch:

| CustomerID | CampaignID | Clicked? | BrowsedNode123ThatWeek | BrowsedNode456ThatWeek | BrowsedNode789ThatWeek |
|---|---|---|---|---|---|
| 56 | 0123 | Yes | No | No | No |
| 910 | 0123 | Yes | No | No | Yes |
| 12 | 4567 | Yes | No | No | No |

Is the branch at a depth of >2? Yes, stop this branch here.
ValueOfARecipientInThisLeaf=programValue*Click%InThisLeaf/Click%InThisProgram=$0.50*1.0/0.5=$1.00.

The resulting tree is illustrated in FIG. 4B. New recipients for campaigns in this program may now have their personal/individual program value determined by traversing this decision tree.

Any number of attributes may be considered for segmenting the nodes of a decision tree. By way of example only, attributes may include whether the recipient clicked/did not click a particular program; clicked/did not click this family; customer tier; duration as a customer; whether the recipient opted out of a given category of mail; the recipient's geographic location; email provider; vendors associated with prior purchases; browsed nodes from which a given product was purchased; browsed nodes from which a given product was viewed; any purchase/views of a high-value product; and/or whether the recipient is a preferred customer. Other attributes may include, by way of example only, frequency of purchases/views of products; how recently a recipient viewed/purchased a product; local climate; web services used by the recipient; whether a product was purchased from a browsed node targeted to this program's products; products most frequently purchased from a browsed node; and/or whether clicked on another program with a product in the same browsed node as the given program's product.

Individualized Prioritization when not Enough Individual Data is Present

Referring again to Block 250 of FIG. 2 and Block 540 of FIGS. 5 and 6, these blocks have assumed that sufficient attributes were available for the given potential recipient to allow the decision tree or other learning structure to be evaluated for the given potential recipient, to obtain metrics. Other embodiments that will now be described need not make that assumption. Rather, according to some embodiments, where sufficient data is not available for the potential recipient, and/or for other reasons, an effectiveness metric may be determined for a subgroup of the potential recipients that includes the given potential recipient. Stated differently, a subgroup of recipients similar to the prospective recipient is identified, but for which sufficient attribute data may be available. Then, the decision tree is evaluated for the subgroup, and the resulting effectiveness metric is used for the potential recipient.

Figure 7:
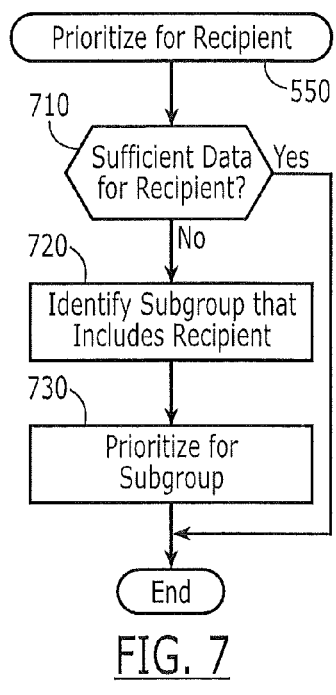
FIG. 7 is a flowchart of operations that may be performed to prioritize for a recipient, such as illustrated at Block 550 of FIGS. 5 and 6.

FIG. 7 is a flowchart of operations that may be performed to prioritize a given campaign and/or program for a potential recipient according to these embodiments. Referring to FIG. 7, at Block 710, if there is insufficient data for the recipient (and/or for any other reason), then at Block 720 a subgroup of recipients is identified that includes the potential recipient. In some embodiments, the subgroup may be identified as having a set of attributes common to the recipients within the subgroup, that are also similar to the potential recipient's attributes. Other techniques for identifying the subgroup may include, for example, clustering techniques. Then, at Block 730 the decision tree is traversed for the attributes of the subgroup in order to obtain a priority metric. This priority metric is then assigned to the potential recipient for whom sufficient attribute data was not available. Accordingly, decision trees may be used even when a potential recipient does not have sufficient attributes, for example because the potential recipient has limited historical data with the seller to sufficiently allow the decision tree to be traversed based on the known attributes of the potential recipient.

Target Expansion Beyond the List of Potential Recipients

Decision trees or other learning structures according to various embodiments described herein may also be used to identify recipients that are not initially included in a list of potential recipients associated with a campaign. Thus, the learning structures described herein may be used not only to select recipients from among a list of prospective recipients, but also to select a recipient who is not initially included in a list of prospective recipients. This aspect may be referred to as "target expansion".

Figure 8:
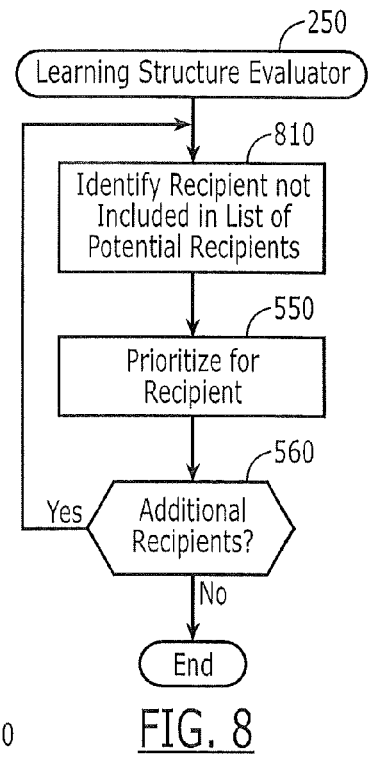
FIG. 8 is a flowchart of operations that may be performed by a learning structure evaluator, such as a learning structure evaluator 250 of FIG. 2.

Referring to FIG. 8, at Block 810, a recipient who is not included in the list of potential recipients for a particular campaign or program is identified. In some embodiments, the recipient may be randomly selected in order to test the effectiveness of the particular campaign or program to recipients who were not identified in the target recipient list for the campaign/program. Alternatively, a recipient for a particular campaign may be identified from a target list for another campaign or program, in such cases where it was believed that the given campaign or program may have value to the target list of another campaign or program. Thus, in cases where there may be some similarities between two or more campaigns, it may be desirable to share the recipient list among the campaigns/programs and then individually determine potential value of the campaigns for each recipient.

Still referring to FIG. 8, once the recipient is identified, the decision tree is traversed to obtain a metric for the recipient who is not initially included in the list of potential recipients at Block 550. These operations may then performed for remaining additional recipients at Block 560. Accordingly, these embodiments may determine an effectiveness metric of a campaign message for a recipient that is not initially included in the potential recipient list associated with the campaign. Based on the effectiveness metric, a subset of the campaign messages may be selected for sending to the recipient.

Figure 9:
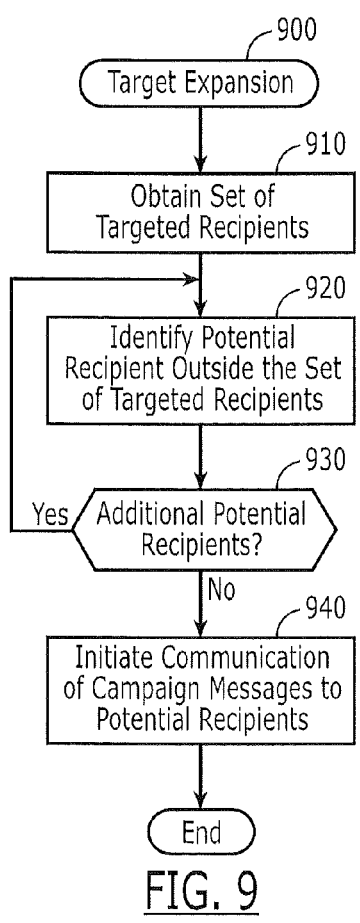
FIG. 9 is a flowchart of operations that may be performed for target expansion according to various embodiments described herein.

Target expansion according to various embodiments described herein may also be used independent of the use of a learning structure such as a decision tree. FIG. 9 is a flowchart of embodiments that can use target expansion 900 independent of the use of a learning structure or decision tree. Specifically, at Block 910, a set of targeted recipients for a campaign message may be obtained at a server computer. As noted above, the set of targeted recipients may be obtained by a random selection, by selection from other campaigns or programs and/or using other techniques. At Block 920, a potential recipient that is outside the set of targeted recipients for the campaign message may be identified. The potential recipient may be identified by identifying that the campaign message may have a high potential effectiveness and/or a high potential economic value relative to the potential recipient, even though the potential recipient is outside the set of targeted recipients for the campaign message. The operations of Block 920 may be repeated at Block 930 for additional potential recipients. Finally, at Block 940, communicating a campaign message to a device of the potential recipient over a communications network is initiated using, for example, an email, text message and/or instant message, even though the potential recipient is outside the set of targeted recipients for the campaign message.

Other Embodiments

As described above, various embodiments described herein may use a decision tree for campaign message prioritization. The decision tree can include a hierarchy of attributes of past recipients that segment decisions among a hierarchy of subgroups of the past recipients. A decision tree according to some embodiments described herein may include at least one root node, at least one intermediate level node and at least one leaf node, with various branches therebetween. Other embodiments may use a more simple approach by splitting recipients of the campaign message(s) or program of campaign messages based on whether or not they have previously clicked on (i.e., selected) a campaign or program. Splitting on the attribute "previously clicked on program" can reward programs that were successful at attracting previous interest, and may obviate the need for campaign originators to perform this work manually.

Decision trees according to various embodiments described herein can segment on a series of attributes, wherein each group of recipients determined by a previous segmentation may be segmented again by a different attribute. A best attribute to be used can be determined dynamically based on how much it helps to differentiate between the segments involved and/or how many recipients it breaks each segment into. By using a decision tree, the recipients may be subdivided based on many attributes, not just a small set, so as to increase the specificity of the program value assigned. Moreover, by automatically choosing the attributes that are most informative, the decision tree can reach a high or maximum specificity in fewer or minimum decisions and give more insight into what attributes are more important about a recipient when targeting campaign messages to them.

Decision trees according to various embodiments described herein can simultaneously use a wide variety of data about the recipients and can also incorporate new data. Customer attributes may be taken directly from data warehouse tables that the business controls and that the business can add to at will. Moreover, the attributes for each model may be selected independently, so that the most appropriate attributes may be used. As a result, even new attributes that only predict the value for a specific program/campaign may be used because they need only have an effect on the programs/campaigns they predict.

A decision tree according to various embodiments described herein may be built as a precursor to planning. The decision trees may be interesting to study in their own right, since they can summarize what customer attributes stand out as being predictive of performance (either good or bad). A planner can even use the decision tree to generate a personalized operational performance system estimate for each campaign eligible to be sent to each potential recipient. The planner can then select for each potential recipient the campaign with the highest predicted value.

Finally, as noted above, other learning structures may also be used including neural networks, support vector machines and/or pure Bayesian probability. Neural networks may be effective for the same kind of managing as decision trees, but without the issue of splitting the customer base into too many subcategories and, therefore, losing statistical significance after deciding from a larger number of attributes. However, they are potentially computationally expensive. Support vector machines may give the benefit of being able to consider millions of attributes without a significant cost to computational complexity. However, complexity may increase as more than the square of number of data points (in this case, recipients, of which there generally will be many) and may not be able handle the noise of the dataset where the attributes given may be insufficient to predict with certainty. Bayesian probability, where each attribute is considered independent generally will, similar to neural networks, not split the recipients into too few categories. However, attribute correlations may not be seen.

Various embodiments illustrated herein have described decision trees that can be generated by generating a hierarchy of attributes of past recipients that segment decisions among a hierarchy of subgroups of past recipients. However, other embodiments can structure the decision tree based on content of the campaign messages themselves. Thus, the content or subject matter of the messages themselves may be classified by, for example, performing keyword searches and/or text recognition on the content. The keywords may be mapped into a decision tree based on frequency of occurrence or other parameters. Then, the contents of prior campaigns that were clicked on by the prospective recipient may also be scanned for keywords, and the decision tree may be traversed based on these keywords to obtain a prospective value. Accordingly, in some embodiments, the attributes that are used in the decision tree may be the contents of the campaign messages themselves. In other embodiments, a decision tree for the contents need not be used. Rather, text recognition may be used to match keywords in a campaign message that was previously clicked on by the prospective recipient to keywords in the various campaign messages in a program, to obtain relative value scores. Accordingly, these embodiments may evaluate content of at least one campaign message for a prospective potential recipient relative to prior information about the respective recipient. The information may include attributes, demographics and/or prior behavior. For example, a campaign may relate to a given type of product. The potential recipient's prior behavior (not purchasing and/or not browsing) for this type of product may be analyzed, and this prior behavior can be used as a filter to exclude campaigns for the given type of product.

Various embodiments have been described fully herein with reference to the accompanying figures, in which various embodiments are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and were described in detail herein. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," "including," "have," "having" or variants thereof when used herein, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element or variants thereof, it can be directly responsive or connected to the other element, or intervening elements may be present. In contrast, when an element is referred to as being "directly responsive" or "directly connected" to another element or variants thereof, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Moreover, although some of the diagrams include arrows on communication paths to show a primary direction of communication, it is to be understood that communication may occur in the opposite direction to the depicted arrows.

Various embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s)

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A campaign planning server for prioritizing campaign messages from a program of campaign messages, a campaign message having a list of potential recipients associated therewith, the campaign planning server comprising a campaign planner that comprises:
    a decision tree generator that is configured to select one or more targeted recipients that are outside the list of potential recipients for the campaign message and adding the one or more targeted recipients to the list of potential recipients, the decision tree generator further configured to generate a decision tree for at least one of the campaign messages in a program of campaign messages, the decision tree comprising a hierarchy of attributes of past recipients of the at least one of the campaign messages that segments decisions among a hierarchy of subgroups of the past recipients, wherein individual attributes within the hierarchy of attributes include whether individual ones of the past recipients purchased a product included in the at least one of the campaign messages and whether the individual ones of the past recipients viewed the product included in the at least one of the campaign messages;
    a decision tree evaluator that is configured to apply attributes of a one of the potential recipients to the decision tree to obtain a metric of potential value of the at least one of the campaign messages to the one of the potential recipients, wherein the metric of potential value represents a measure of effectiveness in attracting a response from the one of the potential recipients to the at least one of the campaign messages based at least upon a total number of campaign messages previously received by the one of the potential recipients;
    a selector configured to prioritize the at least one of the campaign messages for the one of potential recipients by selecting a subset of the campaign messages for sending to the one of potential recipients based upon the metric of potential value of the at least one of the campaign messages; and
    wherein the evaluating performed by the decision tree evaluator and the selecting performed by the selector are repeated for the program of campaign messages until all potential recipients in the list of potential recipients have been evaluated and selected.

2. A campaign planning server according to claim 1:
    wherein the decision tree comprises a first decision tree, the metric comprises a first metric, and the decision tree generator is configured to generate a second decision tree for the program of campaign messages, the second decision tree comprising the hierarchy of attributes of past recipients of the program of campaign messages that segments decisions among the hierarchy of subgroups of the past recipients; and
    wherein the decision tree evaluator is configured to apply at least some attributes of the one of the potential recipients to the second decision tree to obtain a second metric representing the potential value of the program of campaign messages to the one of the potential recipients.

3. A campaign planning server according to claim 1:
    wherein the program of campaign messages is a first program of campaign messages, the decision tree is a first decision tree, the hierarchy of attributes is a first hierarchy of attributes, the hierarchy of subgroups is a first hierarchy of subgroups, and the metric of potential value is a first metric of potential value;
    wherein the decision tree generator is further configured to generate a second decision tree for a second program of campaign messages, the second decision tree comprising a second hierarchy of attributes of past recipients of the second program of campaign messages that segment decisions among a second hierarchy of subgroups of the past recipients; and
    wherein the decision tree evaluator is further configured to apply attributes of the one of the potential recipients to the second decision tree to obtain a second metric of potential value of the second program of campaign messages to the one of the potential recipients.

4. A campaign planning server according to claim 1 wherein the decision tree evaluator is configured to apply attributes of the one of the potential recipients to the decision tree by traversing the decision tree from a root node thereof to a leaf node thereof based at least in part upon the attributes of the one of the potential recipients.

5. A campaign planning server according to claim 4 wherein the decision tree generator is further configured to apply a metric of economic value to individual leaf nodes of the decision tree and wherein the decision tree evaluator is further configured to assign to the one of the potential recipients the metric of economic value of a traversed leaf node.

6. A computer program product for operating a campaign planning server, the computer program product comprising a non-transitory computer-readable medium having computer-readable program code executable by the server, the computer-readable program code being configured to provide the decision tree generator or the decision tree evaluator of claim 1.

7. A method, comprising:
    selecting, via a computing device, one or more targeted recipients that are not included in a list of potential recipients for a campaign message in a program of campaign messages;
    adding, via the computing device, the one or more targeted recipients to the list of potential recipients;
    generating, via the computing device, a decision tree for the campaign message, the decision tree comprising a hierarchy of attributes of past recipients of one of the campaign messages in the program of campaign messages that segments decisions among a hierarchy of subgroups of the past recipients, wherein individual attributes within the hierarchy of attributes include whether individual ones of the past recipients purchased a product included in at least one of the campaign messages in the program of campaign messages and whether the individual ones of the past recipients viewed the product included in the at least one of the campaign messages in the program of campaign messages;
    applying, via the computing device, attributes of one of the recipients in the list of potential recipients to the decision tree to obtain a metric of potential value of the at least one of the campaign messages in the program of campaign messages to the one of the recipients in the list of potential recipients to the decision tree, wherein the metric of potential value represents a measure of effectiveness in attracting a response from the one of the recipients in the list of potential recipients to the at least one of the campaign messages in the program of campaign messages based at least upon a total number of campaign messages previously received by the one of the recipients in the list of potential recipients;

prioritizing, via the computing device, the at least one of the campaign messages in the program of campaign messages for the one of the recipients in the list of potential recipients by selecting a subset of the campaign messages in the program of campaign messages for sending to the one of the recipients in the list of potential recipients based upon the metric of potential value of the at least one of the campaign messages in the program of campaign messages.

8. The method of claim 7, wherein the decision tree comprises a first decision tree, the metric comprises a first metric, and the method further comprises:

generating, via the computing device, a second decision tree for the program of campaign messages, the second decision tree comprising the hierarchy of attributes of past recipients of one of the campaign messages in the program of campaign messages that segments decisions among the hierarchy of subgroups of the past recipients.

9. The method of claim 8, further comprising applying, via the computing device, at least some attributes of the one of the recipients in the list of the potential recipients to the second decision tree to obtain a second respective metric representing the potential value of the program of campaign messages to the one of the recipients in the list of the potential recipients.

10. The method of claim 7, wherein the program of campaign messages is a first program of campaign messages, the decision tree is a first decision tree, the hierarchy of attributes is a first hierarchy of attributes, the hierarchy of subgroups is a first hierarchy of subgroups, and the metric of potential value is a first metric of potential value, and the method further comprises:

generating, via the computing device, a second decision tree for a second program of campaign message, the second decision tree comprising a second hierarchy of attributes of past recipients of the second program of campaign messages that segment decisions among a second hierarchy of subgroups of the past recipients.

11. The method of claim 10, wherein the metric of potential value is a first metric of potential value and the method further comprising applying attributes of . . . to the second decision tree to obtain a second metric of potential value of the second program of campaign messages to the one of the potential recipients.

12. The method of claim 7, wherein applying, via the computing device, attributes of the one of the potential recipients to the decision tree is accomplished by traversing the decision tree from a root node thereof to a leaf node thereof based at least in part upon the attributes of the one of the potential recipients.

13. The method of claim 12, further comprising applying, via the computing device, a metric of economic value to individual leave nodes of the decision tree.

14. The method of claim 13, further comprising assigning, via the computing device, to individual recipients of the list of potential recipients the metric of economic value of a traversed leaf node.

15. The method of claim 7, further comprising sending, via the computing device, the campaign message to the one or more targeted recipients via electronic mail (E-Mail) or via short message service (SMS).

16. The method of claim 7, further comprising sending, via the computing device, the campaign message to individual recipients in the list of potential recipients via electronic mail (E-Mail) or via short message service (SMS).

17. A non-transitory computer readable medium embodying a program executable in a computing device, the program comprising:

code that selects one or more targeted recipients that are not included in a list of potential recipients for a campaign message in a program of campaign messages;

code that adds the one or more targeted recipients to the list of potential recipients;

code that generates a decision tree for the campaign message, the decision tree comprising a hierarchy of attributes of past recipients of one of the campaign messages in the program of campaign messages that segments decisions among a hierarchy of subgroups of the past recipients, wherein individual attributes within the hierarchy of attributes include whether individual ones of the past recipients purchased a product included in at least one of the campaign messages in the program of campaign messages and whether the individual ones of the past recipients viewed the product included in the at least one of the campaign messages in the program of campaign messages;

code that applies attributes of one of the recipients in the list of potential recipients to the decision tree to obtain a metric of potential value of the at least one of the campaign messages in the program of campaign messages to the one of the recipients in the list of potential recipients to the decision tree, wherein the metric of potential value represents a measure of effectiveness in attracting a response from the one of the recipients in the list of potential recipients to the at least one of the campaign messages in the program of campaign messages based at least upon a total number of campaign messages previously received by the one of the recipients in the list of potential recipients;

code that prioritizes the at least one of the campaign messages in the program of campaign messages for the one of the recipients in the list of potential recipients by selecting a subset of the campaign messages in the program of campaign messages for sending to the one of the recipients in the list of potential recipients based upon the metric of potential value of the at least one of the campaign messages in the program of campaign messages.

18. The non-transitory computer readable medium of claim 17, wherein the decision tree comprises a first decision tree, the metric comprises a first metric, and the program further comprises:

code that generates a second decision tree for the program of campaign messages, the second decision tree comprising the hierarchy of attributes of past recipients of one of the campaign messages in the program of campaign messages that segments decisions among the hierarchy of subgroups of the past recipients.

19. The non-transitory computer readable medium of claim 18, the program further comprising code that applies at least some attributes of the one of the recipients in the list of the potential recipients to the second decision tree to obtain a second respective metric representing the potential value of the program of campaign messages to the one of the recipients in the list of the potential recipients.

20. The non-transitory computer readable medium of claim 17, wherein the code that applies attributes of the one of the potential recipients to the decision tree traverses the decision tree from a root node thereof to a leaf node thereof based at least in part upon the attributes of the one of the potential recipients.

21. The non-transitory computer readable medium of claim 20, wherein the program further comprises code that applies a metric of economic value to individual leave nodes of the decision tree.

22. The non-transitory computer readable medium of claim 21, wherein the program further comprises code that assigns to individual recipients of the list of potential recipients the metric of economic value of a traversed leaf node.

23. The non-transitory computer readable medium of claim 17, wherein the program further comprises code that sends the campaign message to the one or more targeted recipients via electronic mail (E-Mail) or via short message service (SMS).

24. The non-transitory computer readable medium of claim 17, wherein the program further comprises code that sends the campaign message to individual recipients in the list of potential recipients via electronic mail (E-Mail) or via short message service (SMS).

* * * * *

UNITED STATES PATENT AND TRADEMARK OFFICE
CERTIFICATE OF CORRECTION

| | | |
|---|---|---|
| PATENT NO. | : 8,775,334 B1 | Page 1 of 1 |
| APPLICATION NO. | : 12/878478 | |
| DATED | : July 8, 2014 | |
| INVENTOR(S) | : Daniel B. Lloyd et al. | |

It is certified that error appears in the above-identified patent and that said Letters Patent is hereby corrected as shown below:

In the Claims:

Column 19, claim 1, line 22, delete "a" and insert --the--, to read: --messages in the program of campaign--.

Column 19, claim 1, line 34, delete "a", to read: --attributes of one of the potential recipients--.

Column 21, claim 7, line 4, after "recipients;", add --and--, to read: --list of potential recipients; and--.

Column 21, claim 10, line 38, delete "message" and add --messages--, to read: --program of campaign messages,--.

Column 21, claim 11, line 45, delete "of...", to read: --applying attributes to the second decision--.

Signed and Sealed this
First Day of December, 2015

Michelle K. Lee
*Director of the United States Patent and Trademark Office*